(12) United States Patent
Si et al.

(10) Patent No.: US 8,349,195 B1
(45) Date of Patent: Jan. 8, 2013

(54) METHOD AND SYSTEM FOR PROVIDING A MAGNETORESISTIVE STRUCTURE USING UNDERCUT FREE MASK

(75) Inventors: Weimin Si, Pleasanton, CA (US); Liubo Hong, San Jose, CA (US); Honglin Zhu, Fremont, CA (US); Winnie Yu, San Jose, CA (US); Rowena Schmidt, Gilroy, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1230 days.

(21) Appl. No.: 12/163,865

(22) Filed: Jun. 27, 2008

(51) Int. Cl.
*B44C 1/22* (2006.01)
*G11B 5/127* (2006.01)

(52) U.S. Cl. ......... 216/22; 216/11; 216/41; 216/46; 216/47; 216/58; 216/67; 216/88; 427/127; 427/128; 360/110; 360/122; 360/126; 360/313; 360/317; 360/319; 360/320; 360/324; 360/325; 360/326; 29/603.13; 29/603.15; 29/603.18

(58) Field of Classification Search .......... 216/11, 216/22, 41, 46, 47, 58, 67, 88; 360/320, 360/313, 317, 319, 110, 122, 126, 324, 325, 360/326, 327; 29/603.13, 603.15, 603.18; 427/127, 128
See application file for complete search history.

(56) References Cited

U.S. PATENT DOCUMENTS

| | | | |
|---|---|---|---|
| 4,939,837 A | 7/1990 | Krounbi | |
| 5,654,128 A | 8/1997 | Hsu | |
| 5,669,133 A | 9/1997 | George | |
| 5,718,976 A | 2/1998 | Dorfman et al. | |
| 6,156,485 A | 12/2000 | Tang et al. | |
| 6,211,061 B1 | 4/2001 | Chen et al. | |
| 6,212,047 B1 | 4/2001 | Payne et al. | |
| 6,309,955 B1 | 10/2001 | Subramanian et al. | |
| 6,320,725 B1 | 11/2001 | Payne et al. | |
| 6,421,212 B1 | 7/2002 | Gibbons et al. | |
| 6,468,642 B1 | 10/2002 | Bray et al. | |
| 6,493,926 B2 | 12/2002 | Han et al. | |
| 6,495,311 B1 | 12/2002 | Khan et al. | |
| 6,496,334 B1 | 12/2002 | Pang et al. | |
| 6,582,889 B1 | 6/2003 | Kamijima | |
| 6,632,707 B1 | 10/2003 | Wang et al. | |
| 6,713,237 B2 * | 3/2004 | Seigler et al. | 430/314 |
| 6,728,055 B1 | 4/2004 | Gill et al. | |
| 6,798,620 B2 | 9/2004 | Hiramoto et al. | |
| 6,801,408 B1 | 10/2004 | Chen et al. | |
| 6,989,971 B2 | 1/2006 | Lin et al. | |
| 7,037,847 B2 | 5/2006 | Le et al. | |

(Continued)

OTHER PUBLICATIONS

U.S. Appl. No. 11/635,830 (R1979), filed Dec. 7, 2006, 25 pages.

*Primary Examiner* — Nadine Norton
*Assistant Examiner* — Christopher Remavege

(57) ABSTRACT

A method and system provide a magnetoresistive structure from a magnetoresistive stack that includes a plurality of layers. The method and system include providing a mask that exposes a portion of the magnetoresistive stack. The mask has at least one side, a top, and a base at least as wide as the top. The method and system also include removing the portion of the magnetoresistive stack to define the magnetoresistive structure. The method and system further include providing an insulating layer. A portion of the insulating layer resides on the at least one side of the mask. The method and system further include removing the portion of the insulating layer on the at least one side of the mask and removing the mask.

16 Claims, 9 Drawing Sheets

U.S. PATENT DOCUMENTS

| | | |
|---|---|---|
| 7,061,728 B2 * | 6/2006 | Pinarbasi .................. 360/320 |
| 7,070,697 B2 * | 7/2006 | Freitag et al. ................. 216/22 |
| 7,095,585 B2 | 8/2006 | Payne et al. |
| 7,146,711 B2 | 12/2006 | Han et al. |
| 7,163,751 B2 | 1/2007 | Wayton et al. |
| 7,175,944 B2 | 2/2007 | Yin et al. |
| 7,194,797 B2 * | 3/2007 | Pinarbasi ................ 29/603.14 |
| 7,228,617 B2 | 6/2007 | Lin et al. |
| 7,230,801 B2 | 6/2007 | Lin et al. |
| 7,237,321 B2 | 7/2007 | Cyrille et al. |
| 7,262,138 B1 | 8/2007 | Singh et al. |
| 7,270,917 B2 | 9/2007 | Yin et al. |
| 7,272,080 B2 | 9/2007 | Kudo |
| 7,275,304 B2 | 10/2007 | Sakai et al. |
| 7,283,337 B2 | 10/2007 | Sakai et al. |
| 7,369,371 B2 | 5/2008 | Freitag et al. |
| 7,640,650 B2 * | 1/2010 | Araki et al. ............... 29/603.12 |
| 8,316,527 | 11/2012 | Hong et al. |
| 2002/0093761 A1 | 7/2002 | Payne |
| 2003/0092281 A1 | 5/2003 | Ramachandramurthy |
| 2003/0179497 A1 | 9/2003 | Harris et al. |
| 2005/0024793 A1 | 2/2005 | Nakabayashi |
| 2005/0094315 A1 | 5/2005 | Payne |
| 2005/0219771 A1 | 10/2005 | Sato |
| 2005/0227482 A1 | 10/2005 | Korzenski |
| 2006/0025053 A1 * | 2/2006 | Cyrille et al. ................. 451/36 |
| 2006/0044705 A1 | 3/2006 | Hasegawa et al. |
| 2006/0196039 A1 | 9/2006 | Sakai et al. |
| 2006/0198059 A1 | 9/2006 | Sakai et al. |
| 2006/0293208 A1 | 12/2006 | Egbe et al. |
| 2007/0048624 A1 * | 3/2007 | Chen et al. ..................... 430/3 |
| 2007/0217088 A1 | 9/2007 | Freitag et al. |
| 2007/0218679 A1 | 9/2007 | Schneider et al. |

* cited by examiner

METHOD AND SYSTEM FOR PROVIDING A MAGNETORESISTIVE STRUCTURE USING UNDERCUT FREE MASK

BACKGROUND

FIG. 1 depicts a conventional method 10 for defining the stripe height of a magnetoresistive structure using a conventional undercut bi-layer mask. FIGS. 2-3 depict a conventional magnetoresistive device 50, such as a read transducer, during fabrication using the conventional method 10. Referring to FIGS. 1-3, the layers of the magnetoresistive structure stack are provided, via step 12. Typically, step 12 includes sputtering or otherwise depositing the layers for a spin valve or other analogous giant magnetoresistive (GMR) element. A bi-layer mask is provided on the device, via step 14. FIG. 2 depicts a side view of the conventional transducer 50 after step 14 is performed. Thus, the conventional transducer 50 includes a magnetoresistive stack 54 of the magnetoresistive structure layers formed on a substrate 52, which is typically a shield. On the magnetoresistive stack 54 is a bi-layer mask 56 that includes a polydimethylglutarimide (PMGI) layer 60 and a photoresist layer 58. The bi-layer mask 56 has an undercut 62 at the edges of the mask 56. The undercut 62 is formed due to shrinkage of the PMGI layer 60 after the layer is fabricated.

The magnetic structure is defined, via step 16. Typically, this is accomplished by ion milling the magnetoresistive stack 54. Consequently, portions of the magnetoresistive stack 54 exposed by the bi-layer mask 56 are removed. Step 16 defines the stripe height, or maximum distance from the air-bearing surface (ABS), of the magnetoresistive structure. Note that although the ABS is shown in FIGS. 2-3, this is actually just a reference location. The ABS is typically defined in subsequent processing steps, for example via lapping. In addition, the magnetoresistive structure may be defined in the track width direction, which is out of the plane of the page in FIG. 2. The region behind the magnetoresistive structure is refilled with an insulator, such as alumina, via step 18. Also in step 18, other structures may be provided on either side of the magnetic element in the track width direction. For example, hard bias structures (not shown) may be provided at the sides of the magnetic structure. FIG. 3 depicts the conventional magnetic transducer 50 after step 18 is performed. The magnetoresistive structure 54' has been defined in step 16. Redeposition 64 of the magnetoresistive stack 54 materials results from step 16 and resides on the side of the photoresist portion 58. Aluminum oxide 66 and 68 from step 18 resides behind and on the magnetoresistive structure 54 and on the photoresist 58, respectively.

The bi-layer mask 56 is removed, via step 20. Because of the shape of the mask 56, redeposition 64 generated by step 16 and the insulator 68 provided in step 18 generally do not fill the undercut 62. This is shown in FIG. 3. As a result, solvents that attack the PMGI 60 may be used. A lift-off may, therefore, be performed in step 20 to remove the mask 56. Fabrication of the conventional magnetic transducer 50 may then be completed, via step 22. For example, a shield and/or other structures may be provided.

Although the conventional method 10 functions at lower densities, issues arise for higher densities. The bottom, PMGI layer 60 of the bi-layer mask 56 has a smaller length, or critical dimension, than the upper photoresist layer 58. Consequently, as discussed above, the bi-layer mask 64 has an undercut 62. The typical length of the undercut 62 is on the order of forty to fifty nanometers and is subject to large variations. In addition, the stripe height h, is desired to be reduced for higher density recording. For example, the stripe height may be desired to be one hundred nanometers or less. The variations in the undercut 62 are thus a significant fraction of the length of the entire structure 54' being formed. As a result, the magnetoresistive structure 54' may exhibit large variations in the stripe height. Such variations are generally undesirable.

In addition, the bi-layer mask 56 may collapse. The photoresist layer 58 may thus close the undercut 62. Consequently, solvent used in the liftoff process of step 20 may not be able to reach the PMGI 60. The mask 56 thus may become difficult to remove. In addition, a portion of the aluminum oxide 66 resides on the magnetoresistive structure 54'. This and other redeposition on the surface of the conventional magnetoresistive structure 54' may result in variations in the shield-to-shield spacing for the conventional magnetic transducer 50. Such variations are generally undesirable.

Accordingly, what is needed is an improved system and method for providing a magnetoresistive device, particularly which may be suitable for higher recording densities.

SUMMARY

A method and system for providing a magnetoresistive structure from a magnetoresistive stack that includes a plurality of layers are disclosed. The method and system include providing a mask that exposes a portion of the magnetoresistive stack. The mask has at least one side, a top, and a base at least as wide as the top. The method and system also include removing the portion of the magnetoresistive stack to define the magnetoresistive structure. The method and system further include providing an insulating layer. A portion of the insulating layer resides on the at least one side of the mask. The method and system further include removing the portion of the insulating layer on the at least one side of the mask and removing the mask.

DETAILED DESCRIPTION OF THE PREFERRED EMBODIMENTS

Figure 1:
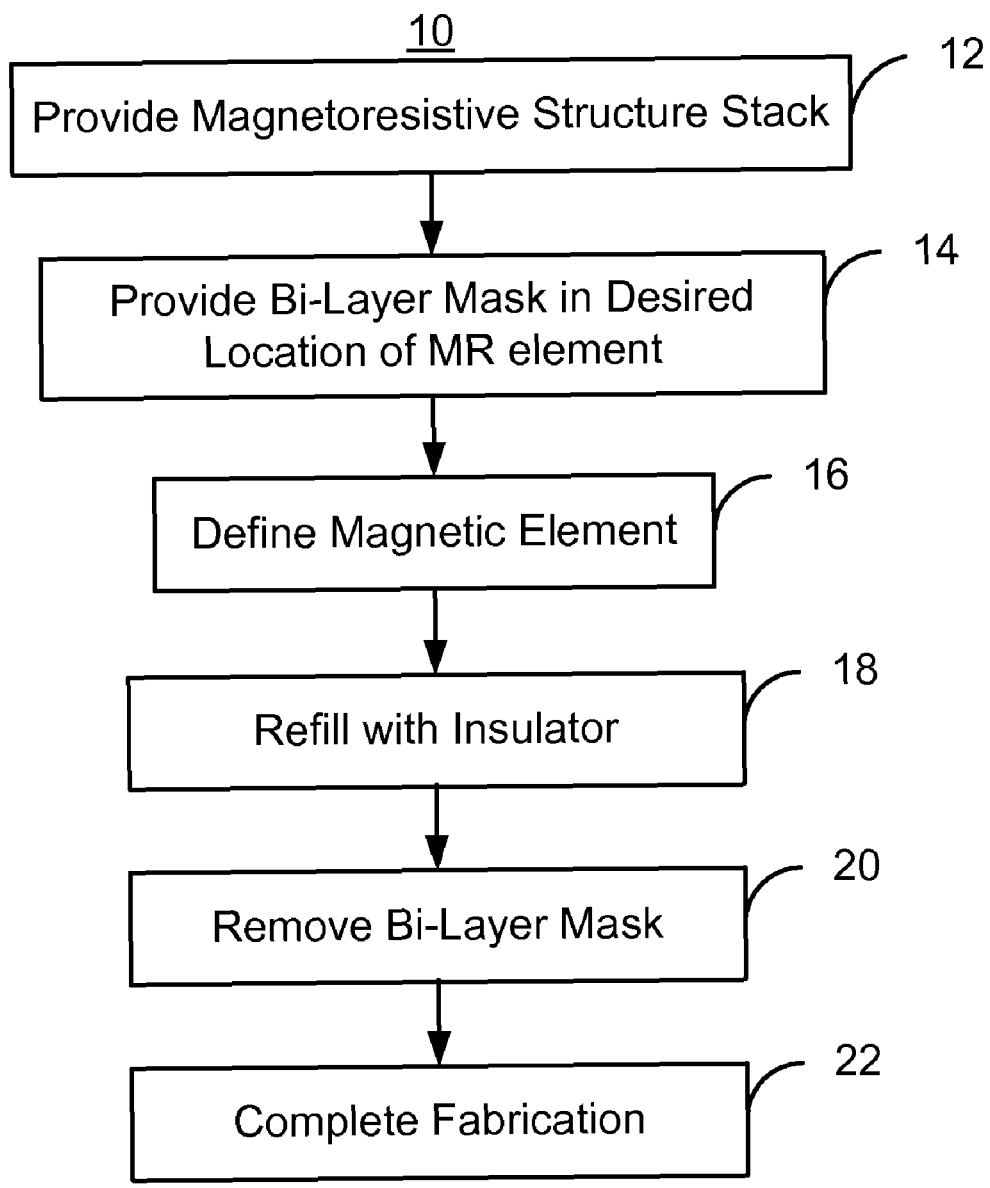
FIG. 1 depicts a conventional method for fabricating a magnetoresistive device.
Figure 2:
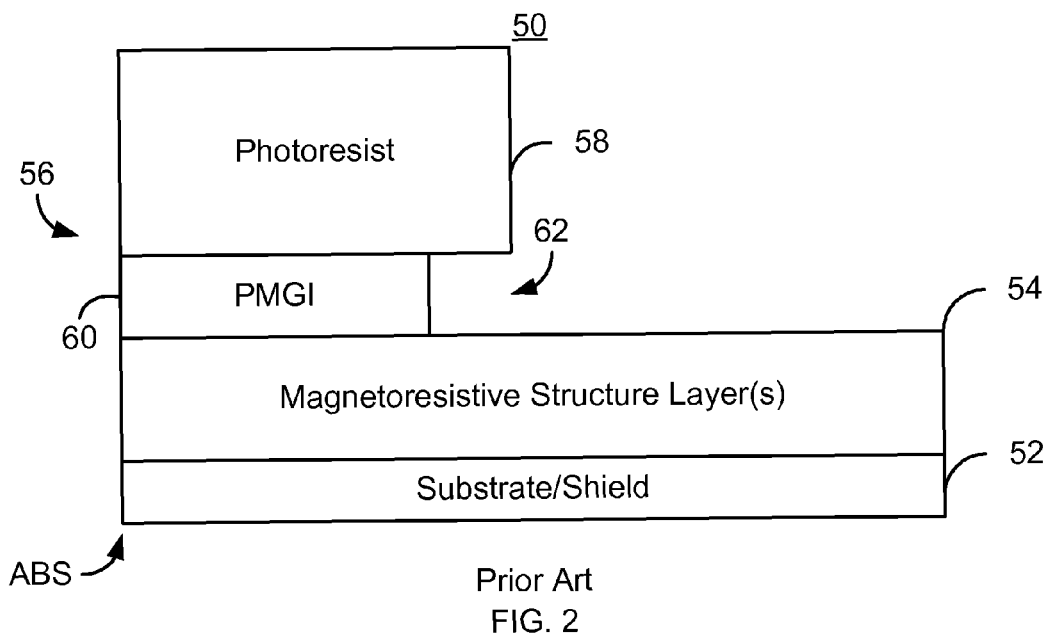
FIGS. 2-3 depict a conventional magnetic transducer during fabrication.
Figure 3:
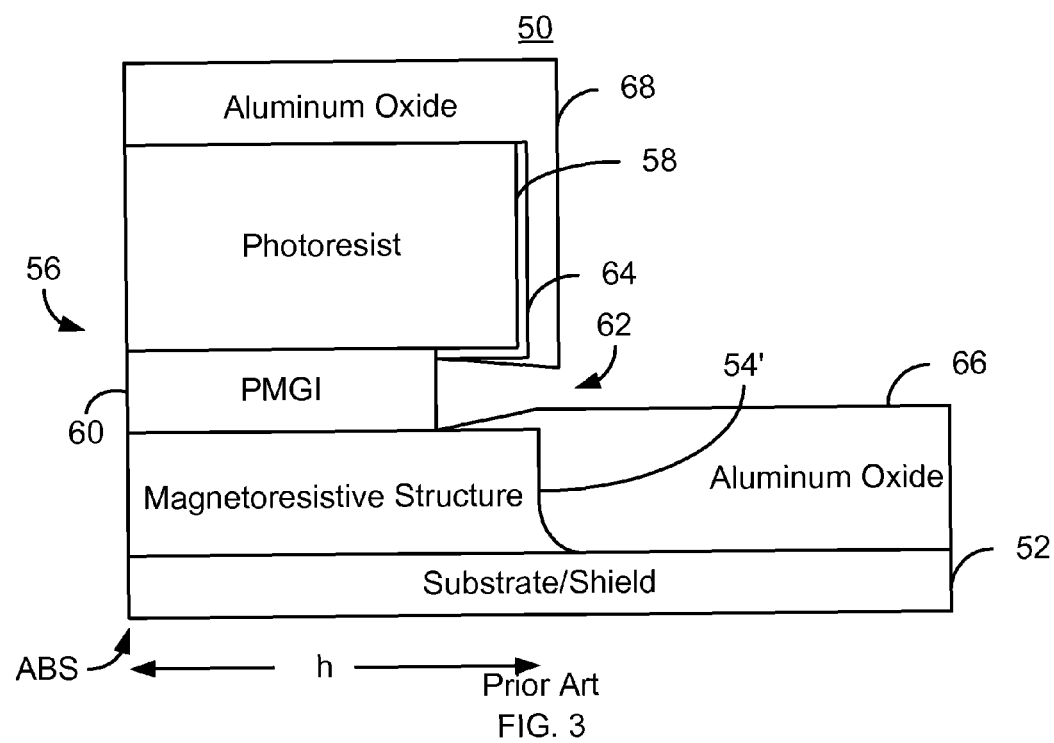
Figure 4:
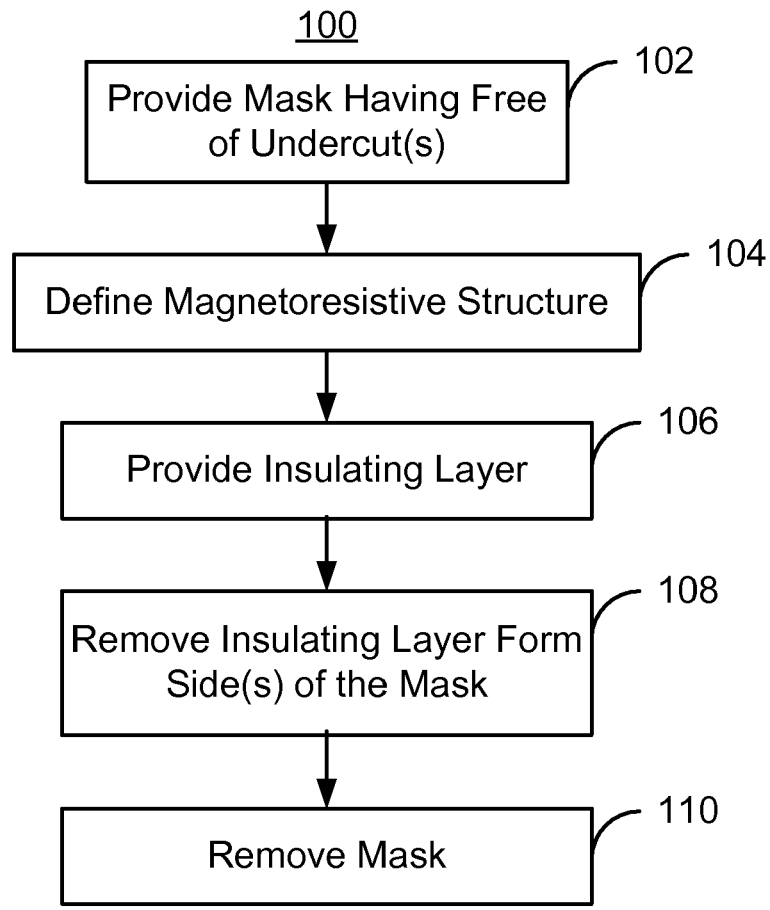
FIG. 4 is a flow chart depicting an exemplary embodiment of a method for fabricating a magnetoresistive device.

FIG. 4 is a flow chart depicting an exemplary embodiment of a method 100 for defining a magnetoresistive structure from a magnetoresistive stack. Although the method 100 is described in the context of particular steps and particular magnetoresistive elements, other magnetoresistive elements may be provided and different and/or additional steps may be used. The steps described may also include one or more sub-steps. In addition, although the method 100 is described in the context of single layers, in one embodiment, such a layer may include multiple layers. The method 100 is also described in the context of providing a single magnetoresistive structure in a magnetic device. However, the method 100 may be used to fabricate multiple magnetoresistive structures and/or multiple magnetic devices at substantially the same time. The method 100 is also described in the context of defining the stripe height for the magnetoresistive structure. Consequently, discussion of structures such as hard bias structures or other components of a magnetic transducer may be omitted or abbreviated.

The method 100 commences after the layers for the magnetoresistive structure have been provided. Stated differently, the magnetoresistive stack is already present in the device being fabricated. Such layers in the magnetoresistive stack are generally blanket deposited. The magnetoresistive layers may include, for example, layers for a spin valve or tunneling magnetoresistive element. In one embodiment, the layers are provided directly on a shield. However, in another embodiment, the magnetoresistive stack may be formed on another structure.

A mask that covers the portion of the magnetoresistive stack from which the magnetic structure is to be formed is provided, via step 102. The mask has a top and a base that is at least as wide as the top. Stated differently, the mask does not have an undercut. Step 102 may include depositing a layer of photoresist and transferring a pattern to the photoresist layer. In one embodiment, the mask is a single layer mask. Such a mask could include a layer of photoresist as well as an underlayer. For example, the mask may be formed on a bottom antireflective coating (BARC) layer. However, there is still no undercut for the mask.

The magnetoresistive structure is defined using the mask, via step 104. Thus, a portion of the magnetoresistive stack is removed in step 104. In one embodiment, step 104 includes performing an ion mill. Thus, the back edge of the magnetoresistive structure may be determined in step 104. As a result, the stripe height may be considered to be determined. Although the ABS is actually defined later, for example via lapping, the ABS is set based on a reference location. The stripe height may be considered to be the distance between the reference location for the ABS and the back edge of the magnetic structure. In one embodiment, the stripe height is not more than one hundred twenty nanometers. In another embodiment, the stripe height might be one hundred nanometers or less. For example, a stripe height of forty to eighty nanometers or less might be provided. Step 104 may also define the magnetic structure in the track width direction. Thus, the edges of the magnetic structure may be determined in step 104.

An insulating layer is provided, via step 106. Thus, the insulating layer covers a portion of the magnetic device exposed by the removal of a portion of the magnetoresistive stack in step 102. In addition, a portion of the insulating layer resides on at least one side of the mask. In one embodiment, the insulating layer includes alumina.

The portion of the insulating layer on the side(s) of the mask is removed, via step 108. In one embodiment, the insulating layer is removed by ion milling the magnetic device at a mill angle. The mill angle is defined from the normal to the surface of the mask on which the insulating layer resides. This mill angle is at least sixty degrees from normal to the top surface of the mask. In one such embodiment, the milling angle is at least seventy degrees and not more than eighty degrees. Milling at such a large mill angle removes the insulating layer from the side(s) of the mask without removing a significant amount of the insulating layer that has a horizontal surface. Thus, little or none of the portion of the insulator layer that resides in the magnetic device behind the magnetic structure may be removed.

The mask is removed, via step 110. In one embodiment, step 110 includes performing a lift off. For example, a solvent that dissolves the mask may be applied and the mask and layers on the mask removed. Fabrication of the device may then be completed.

The method 100 fabricates the magnetoresistive structure using a mask having no undercuts. As a result, a magnetoresistive structure having a reduced stripe height may be reliably fabricated. Stated differently, fabrication of a magnetoresistive structure having lower critical dimensions is possible using the method 100. In addition, variations in the stripe height may be reduced. This may be achieved while maintaining the simplified processing possible when lifting off the mask in step 110. Furthermore, because the mask has no undercuts, fencing or other artifacts of processing on the surface of the magnetoresistive structure may be reduced or avoided. Consequently, the topology of the magnetic device may be flatter. As a result, a reduced shield-to-shield spacing may be achieved. Consequently, a magnetic device for at higher recording densities may be fabricated.

Figure 5:
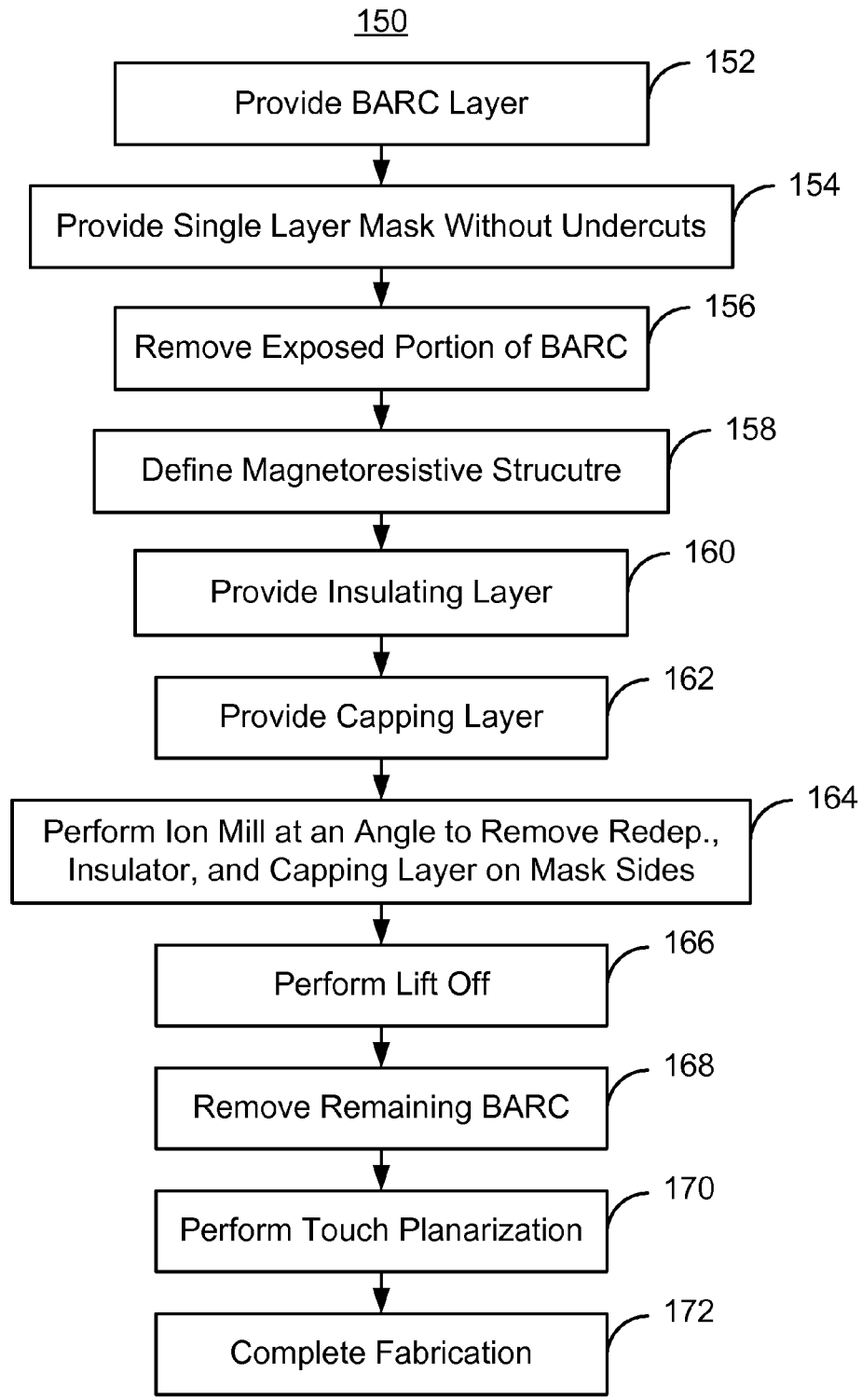
FIG. 5 is a flow chart depicting another exemplary embodiment of a method for fabricating a magnetoresistive device.

FIG. 5 is a flow chart depicting another exemplary embodiment of a method 150 for fabricating a magnetic device. FIGS. 6-16 depict an exemplary embodiment of a magnetic device 200 during fabrication. The method 150 is described in the context of the magnetic device 200. Note that although the ABS is shown in FIGS. 6-16, this is actually just a reference location. The ABS is generally defined in subsequent processing steps, for example via lapping. Consequently, the stripe height described herein may be considered to be measured from a reference location for the ABS to the edge of the magnetoresistive structure distal from the reference location. In addition, FIGS. 6-16 are not drawn to scale.

Although the method 150 is described in the context of particular steps and particular magnetoresistive elements, one of ordinary skill in the art will recognize that other magnetoresistive elements may be provided and different and/or additional steps may be used. In addition, one of ordinary skill in the art will recognize that the steps described may include one or more sub-steps. Although the method 150 and magnetoresistive device 200 are described in the context of providing single layers, such layers may include multiple sub-layers. The method 150 is also described in the context of providing a single magnetoresistive structure in a magnetic device 200. However, the method 150 may be used to fabricate multiple magnetoresistive structures and/or multiple magnetic devices at substantially the same time. The method 150 is also described in the context of defining the stripe height for the magnetoresistive structure. Consequently, discussion of structures such as hard bias structures or other components of a magnetic transducer may be omitted or abbreviated.

The method 150 commences after the layers for the magnetoresistive structure have been provided. Stated differently, the magnetoresistive stack is already present in the device being fabricated. Such layers in the magnetoresistive stack are generally blanket deposited. The magnetoresistive layers may include, for example, layers for a spin valve or tunneling magnetoresistive element. In one embodiment, the layers are provided directly on a shield. However, in another embodiment, the magnetoresistive stack may be formed on another structure.

Figure 6:
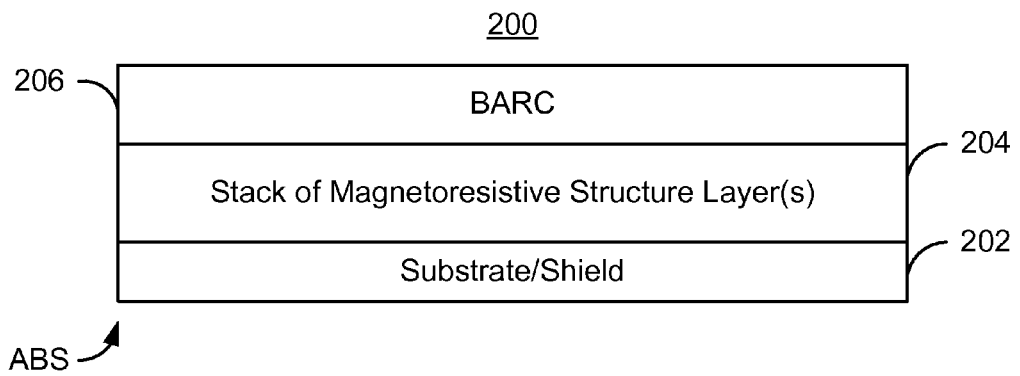
FIGS. 6-16 depict an exemplary embodiment of a magnetoresistive device during fabrication using a single layer mask.

A BARC layer is provided on the magnetoresistive stack, via step 152. In one embodiment, the BARC layer is blanket deposited in step 152. FIG. 6 depicts the magnetic device 200 after step 152 is performed. Thus, a stack 204 of layers for the magnetoresistive structure is shown on a substrate which, in the embodiment shown, is a shield 202. A BARC layer 206 has been provided on the magnetoresistive stack 204. In one embodiment, the BARC layer 206 provided in step 152 is organic, such as AR3 by Shiply. In another embodiment, the BARC layer 206 is inorganic, for example including diamond-like carbon and/or silicon nitride.

Figure 7:
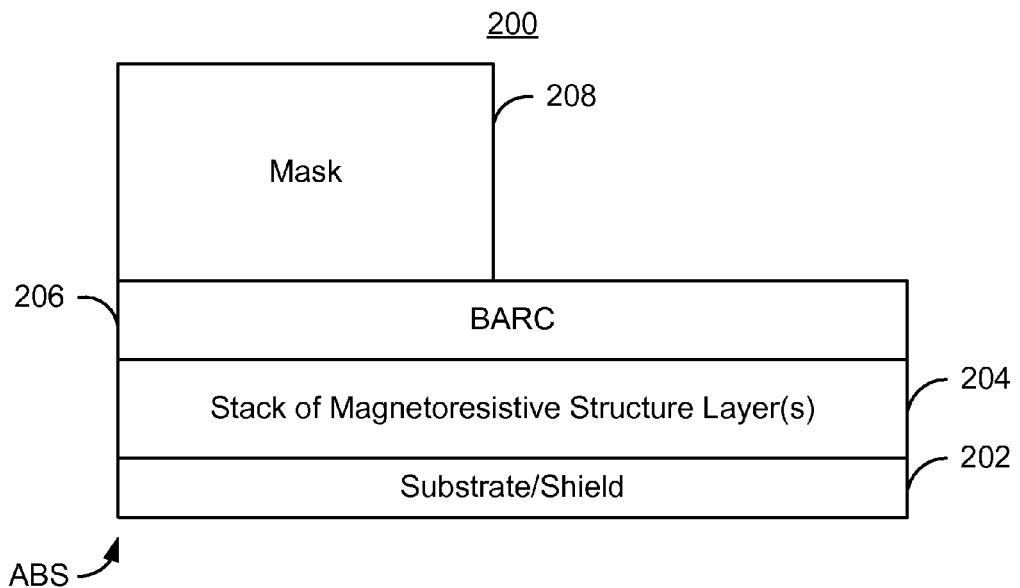

A mask is provided, via step 154. FIG. 7 depicts the magnetic device 200 after step 154 is performed. Thus, a mask 208 is shown. The mask 208 has a top and a base that is at least as wide as the top. Stated differently, the mask 208 does not have an undercut. In the embodiment shown, the mask 208 is single layer mask 208. For example, the mask 208 may be a layer of deep ultraviolet photoresist. Step 154 may thus include depositing a layer of photoresist and transferring a pattern to the photoresist layer.

Figure 8:
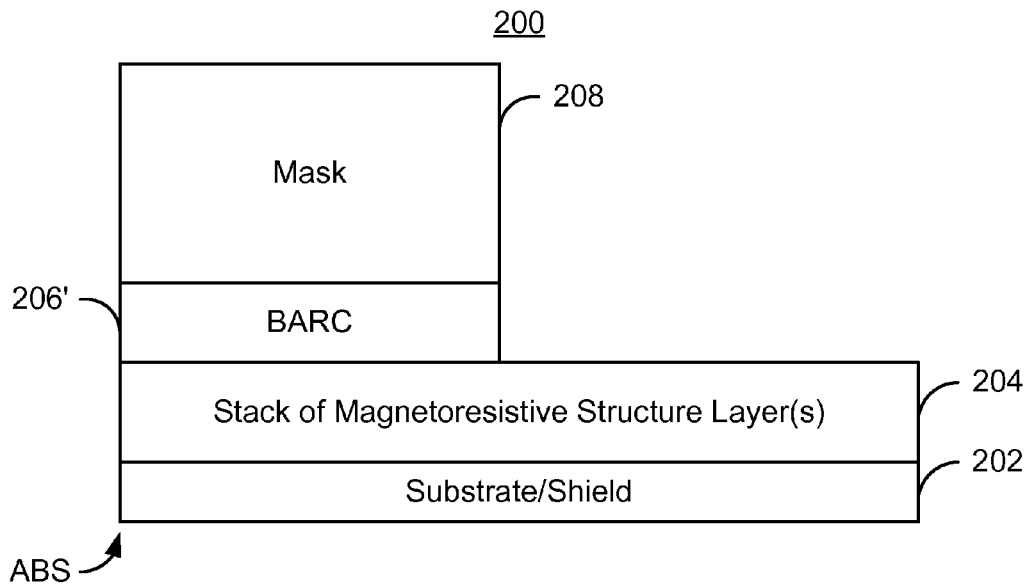

The pattern of the mask 208 is transferred to the BARC layer 206, via step 156. In other words, the exposed portion of the BARC layer 206 is removed. In one embodiment, a directional reactive ion etch (RIE) is performed in step 156. Thus, the RIE performed in step 156 tends to remove more material vertically than horizontally. FIG. 8 depicts the magnetic device 200 after step 156 is performed. Thus, only the BARC 206' covered by the mask 208 remains.

Figure 9:
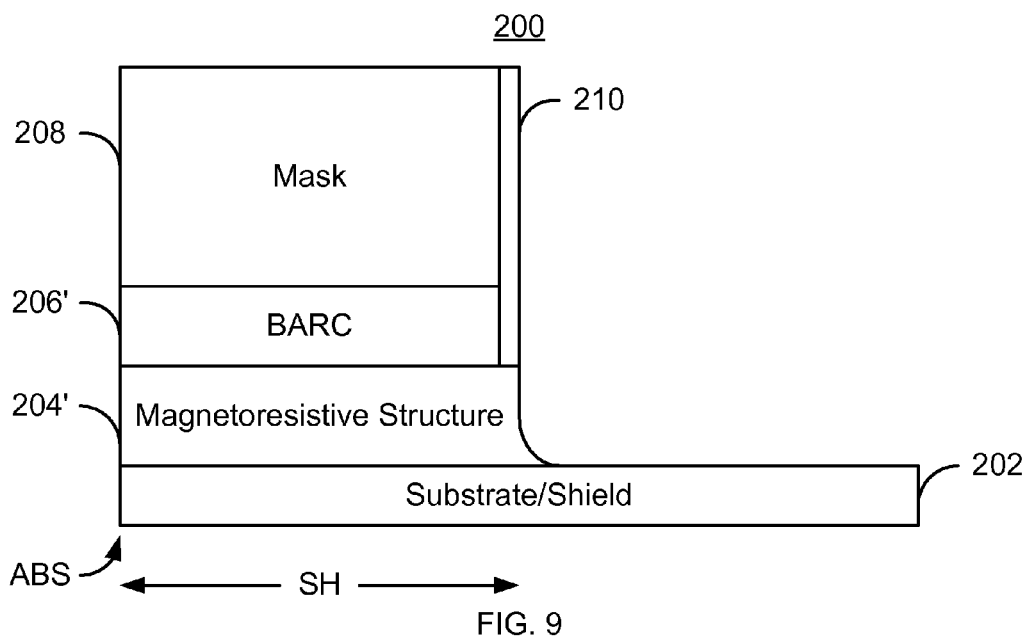

The exposed portion of the magnetoresistive stack 208 is removed to define the magnetoresistive structure, via step 158. In one embodiment, an ion mill is performed in step 158 to define the magnetoresistive structure. FIG. 9 depicts the magnetic device 200 after step 158 is performed. Thus, the magnetoresistive structure 204' remains. The stripe height, SH, is shown in FIG. 9. In one embodiment, the magnetoresistive structure 204' is also defined in the track width direction, perpendicular to the plane of the page in FIG. 9. The track width may be forty nanometers or less. In one embodiment, the stripe height SH is not more than one hundred nanometers. In another embodiment, the stripe height may be less, for example eighty nanometers or less. In another embodiment, the stripe height, SH, may be even smaller, for example forty nanometers or less. Also shown in FIG. 9 is redeposition 210. The redeposition includes materials from the magnetoresistive stack 204 which are removed then redeposited on the magnetic device 200. The redeposition 210 resides on the sides of the BARC 206' and mask 208. Although not shown, some redeposition might also reside on top of the mask 208.

Figure 10:
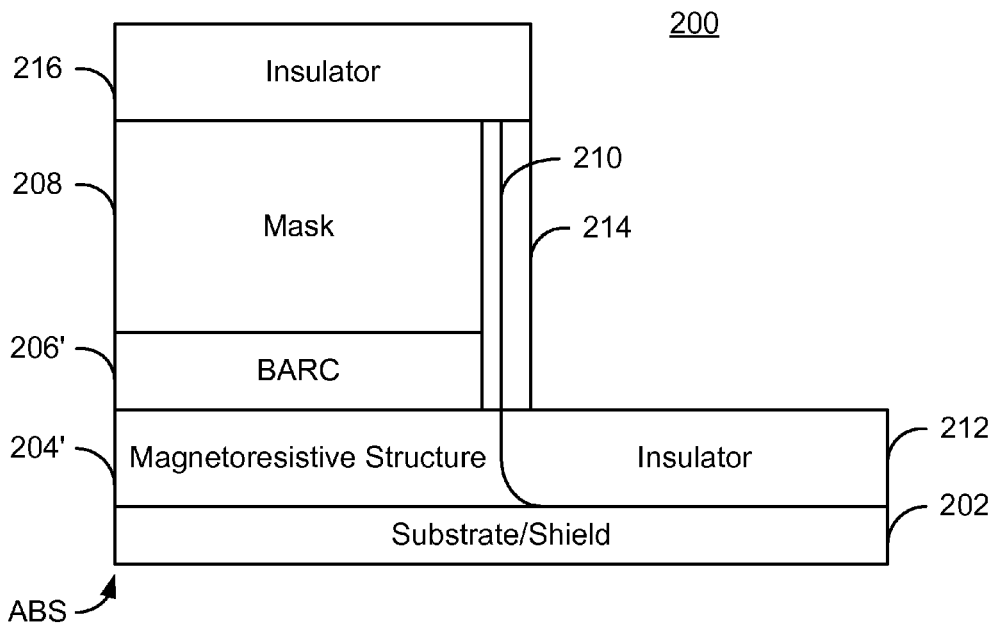

An insulating layer is provided, via step 160. In one embodiment, the insulating layer is blanket deposited on the magnetic device 200. The deposition of the insulator in step 160 may be at a large angle from normal, for example thirty to thirty-five degrees or more. FIG. 10 depicts the magnetic device 200 after step 160 is completed. Thus, an insulator 212 resides behind (distal from the ABS) the magnetoresistive structure 204'. In addition, insulator 214 and 216 has been deposited on the sides and top, respectively, of the mask 208. Thus, the sides of the mask 208 and BARC 206' may be covered by the redeposition 210 and insulator 214. In one embodiment, the insulator 212, 214, and 216 is aluminum oxide. Although the insulators 212, 214, and 216 are shown as separate items, the insulators 212, 214, and 216 may be formed from a single deposition. Further, because the large angle deposition may be used, a desired uniformity of thickness for the insulator 212 may be achieved in step 160.

Figure 11:
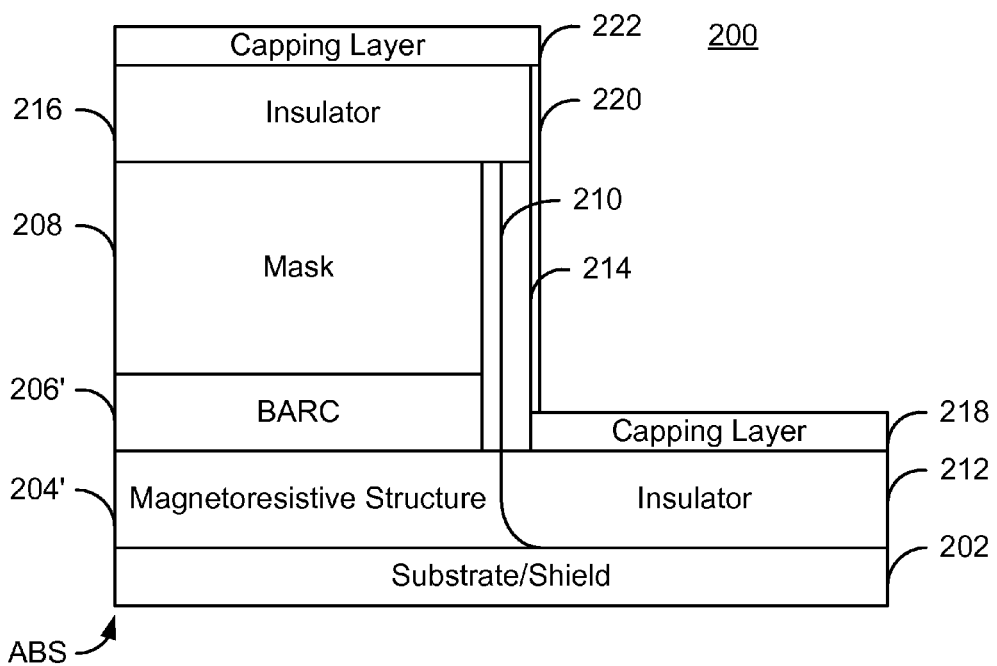

A capping layer is provided on the insulating layer, via 162. The capping layer provided in step 162 may be desired to have a large milling rate dependence on angle. Such a dependence facilitates protection of the insulator 212 in step 164, described below. In one embodiment, step 162 includes depositing a layer of Ta or diamond-like carbon. FIG. 11 depicts the magnetic device 200 after step 162 is provided. The capping layer 218, 220 and 222 are thus shown. Although shown as separate items, the capping layers 218, 220, and 222 are from deposition of a capping layer in step 162. In addition, in one embodiment, step 162 is performed using a directional deposition method, such as ion beam deposition. Such a method allows the capping layer 218 to be formed while reducing, or minimizing, the amount of the capping layer material 220 formed on the sides of the mask 208 and BARC 206'.

Figure 12:
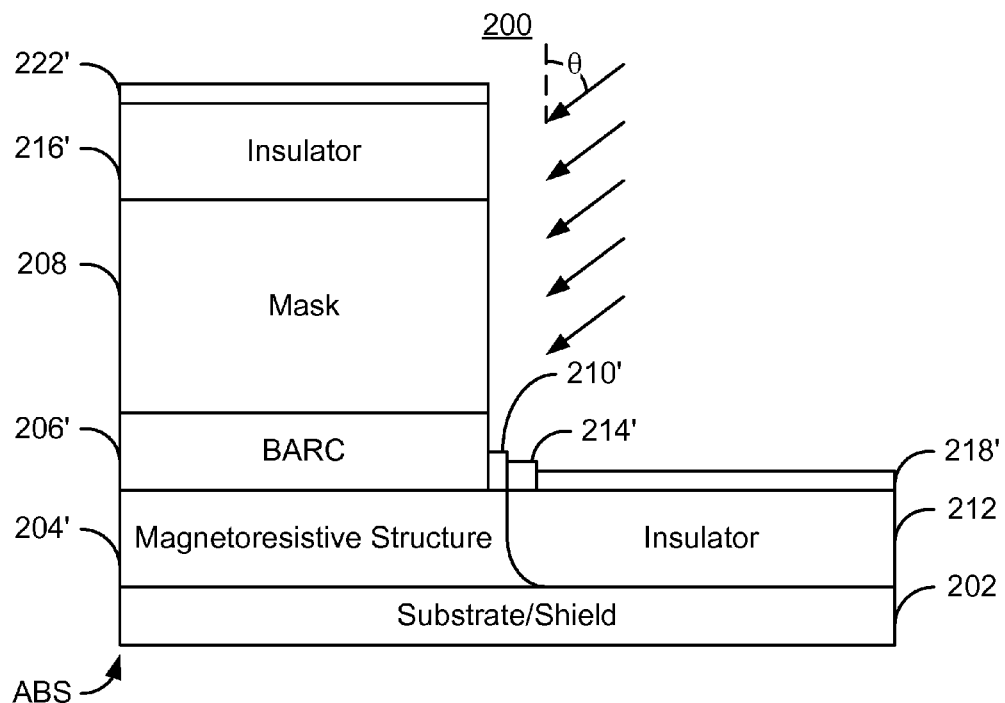

The sides of the mask 208 are exposed, via step 164. Thus, the insulator 214 and redeposition 210 are removed from the sides of the mask 208 in step 164. In one embodiment, step 164 includes performing an ion mill at a milling angle from normal to the top surface of the mask 208 and/or insulator 212. Ion milling at an angle aids in targeting removal of material to vertical surfaces, such as the sides of the mask 208. FIG. 12 depicts the magnetic device 200 during step 164. The ion milling angle for the mill performed in step 164 is θ. In one embodiment, the angle, θ, is at least seventy degrees and not more than eighty degrees. The ion mill of step 164 removes the insulating layer 214, the redeposition 210, and the capping layer 220 on the side(s) of the mask 208. Thus, as shown in FIG. 12, these layers 210, 214 and 220 are substantially removed. However, a small amount of redeposition 210' and insulator 214' may remain after step 164 is completed. This is in part because the capping layer 218' may protect these layers 210' and 214'. In addition, the capping layers 220 and 222 may be wholly or partially removed. Thus, the capping layers 218' and 222' that have been thinned though not removed are shown in FIG. 12.

Figure 13:
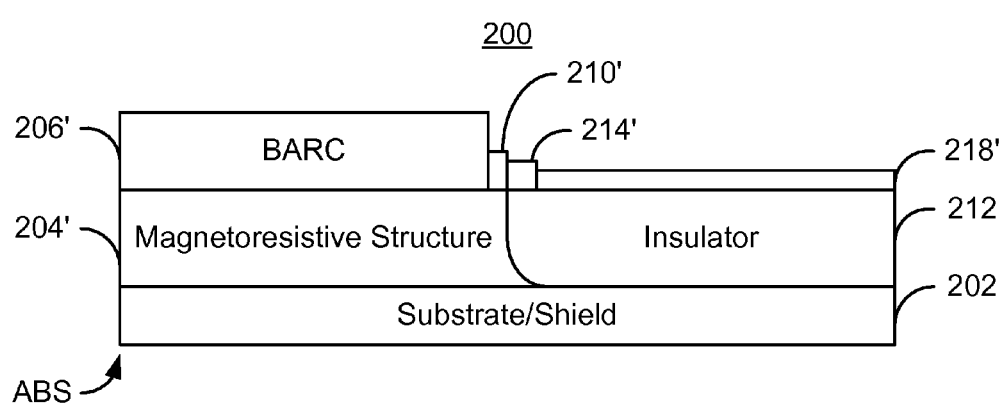

Because the side(s) of the mask 208 are exposed, the mask may be removed by performing a lift off, via step 166. In one embodiment, standard solvents for the photoresist used for the mask 208 may be employed to lift off the mask 208. FIG. 13 depicts the magnetic structure 200 after step 166 is performed. Consequently, the mask 208 has been removed. As a result, the layers 216' and 222' on the mask 208 have also been removed. The underlying BARC 206' has thus been exposed.

Figure 14:
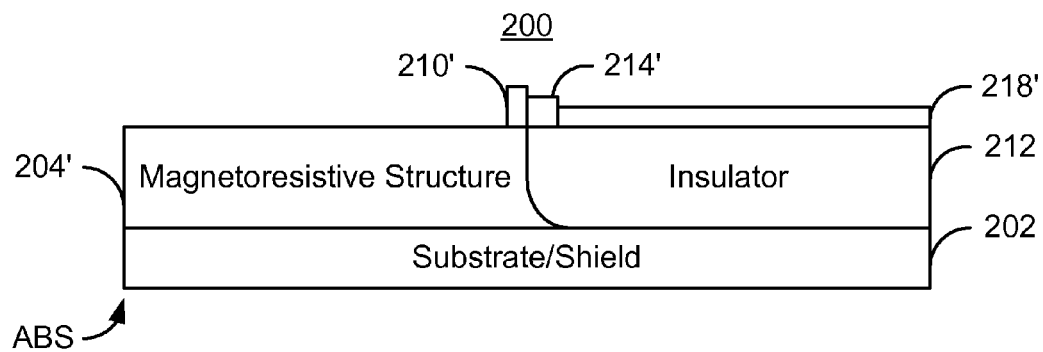
Figure 15:
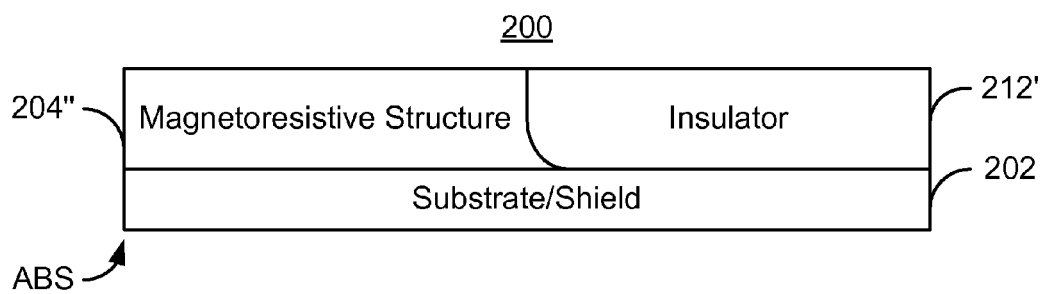

The BARC 206' is removed, via step 168. An RIE may be performed in step 168 to remove the BARC 206' that was below the mask 208. As a result, the top of the magnetoresistive structure 204' is exposed. This situation is shown in FIG. 14. However, as can be seen in FIG. 14, small portions of the redeposition 210' and insulating layer 214' might remain. Consequently, a touch planarization is performed, via step 170. In one embodiment, the touch planarization is a chemical mechanical planarization (CMP). The touch CMP is so termed because the planarization is very light and configured to remove the redeposition 210' and insulating layer 214' without adversely affecting the magnetoresistive structure 204'. In one embodiment, the touch planarization is a touch CMP performed using a pressure of not more than two psi. FIG. 15 depicts the magnetic device after step 170 is performed. Consequently, the top surface of the magnetic device 200, formed by the top surfaces of the magnetoresistive structure 204" and the insulator 212', is substantially flat. Further, the redeposition 210', insulator 214' and capping layer 218' may be removed.

Figure 16:
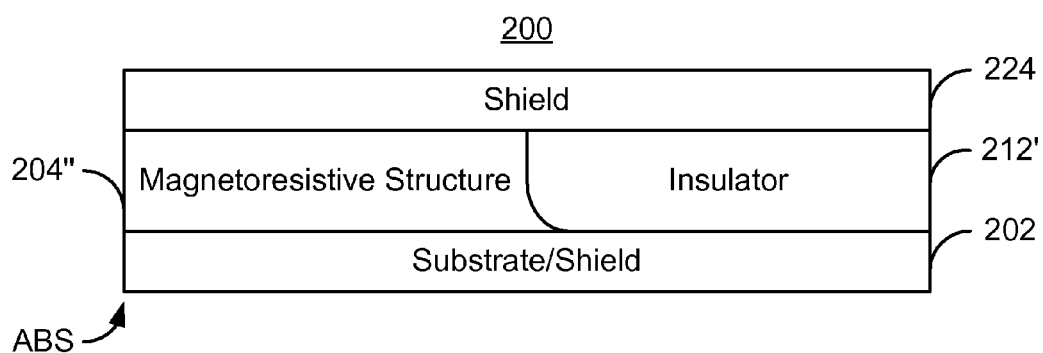

Fabrication of the magnetic device including the magnetoresistive structure 204' is completed, via step 172. For example, a light sputter etch may be performed to remove any oxide on the magnetoresistive structure 204" and the shield deposited on the magnetoresistive structure 204" and refill 212'. FIG. 16 depicts the magnetic device 200 at least a portion of step 172 is completed. Thus, a shield 224 has been provided.

The method 150 fabricates the magnetoresistive structure 204' using a mask 208 having no undercuts. As a result, a magnetoresistive structure 204' having a reduced stripe height may be reliably fabricated. Stated differently, fabrication of a magnetoresistive structure having lower critical dimensions is possible using the method 150. Fabrication of small structures, for example forty to eighty nanometers or smaller, may be facilitated by use of the BARC 206'. In addition, variations in the stripe height may be reduced. This may be achieved while maintaining the simplified processing possible when lifting off the mask in step 166. Furthermore, because the mask 208 has no undercuts, fencing or other artifacts of processing on the surface of the magnetoresistive structure may be reduced or avoided. The artifacts such as 210' and 214' that are present may be removed. Consequently, the topology of the magnetic device 200 may be flatter. As a result, a reduced shield 202-to-shield 224 spacing may be achieved. Consequently, a magnetic device 200 suitable for use at higher recording densities may be fabricated.

We claim:

1. A method for defining a magnetoresistive structure from a magnetoresistive stack including a plurality of layers, the method comprising:
   providing a mask, the mask exposing a portion of the magnetoresistive stack, the mask having at least one side, a top, and a base at least as wide as the top;
   removing the portion of the magnetoresistive stack to define the magnetoresistive structure;
   providing an insulating layer, a portion of the insulating layer residing on the at least one side of the mask;
   providing a capping layer on the insulating layer;
   removing the portion of the insulating layer on the at least one side of the mask; and
   removing the mask, the step of removing the portion of the insulating layer further including removing a portion of the capping layer on the at least one side of the mask.

2. The method of claim 1 wherein the insulator includes alumina and the capping layer includes at least one of Ta and diamond-like carbon.

3. The method of claim 1 wherein the mask has a top surface, step of removing the portion of the insulating layer further includes:
   performing an ion mill at an angle from normal to the top surface, the angle being at least sixty degrees.

4. The method of claim 3 wherein the angle is at least seventy degrees and not more than eighty degrees.

5. The method of claim 1 further comprising:
   performing a touch planarization after the step of removing the mask.

6. The method of claim 5 wherein the touch planarization is a touch chemical mechanical planarization (CMP) and wherein the touch CMP is performed using at least one of a pressure of not more than two psi.

7. The method of claim 1 further comprising:
   providing a bottom antireflective coating (BARC) layer under the mask.

8. The method of claim 7 further comprising:
   removing the BARC layer after the step of removing mask.

9. The method of claim 7 wherein the BARC layer includes an organic BARC layer.

10. The method of claim 7 wherein the BARC includes an inorganic BARC layer.

11. The method of claim 10 wherein the BARC layer includes at least one of diamond-like carbon and silicon nitride.

12. The method of claim 1 wherein the step of removing the portion of the magnetoresistive stack further includes:
    defining a track width of the magnetoresistive structure to be not more than forty nanometers.

13. The method of claim 1 wherein the mask is a single layer mask.

14. A method for defining a magnetoresistive structure from a magnetoresistive stack including a plurality of layers, the method comprising:
    providing a bottom antireflective coating (BARC) layer;
    providing a single layer mask having at least one side, a top, and a base at least as wide as the top, the single layer mask exposing a portion of the magnetoresistive stack and a portion of the BARC layer;
    removing the portion of the BARC layer, a covered portion of the BARC layer remaining;
    removing the portion of the magnetoresistive stack to define the magnetoresistive structure;
    providing an insulating layer, a portion of the insulating layer residing on the at least one side of the single layer mask and the at least one side of the covered portion of the BARC layer;
    providing a capping layer on the insulating layer;
    performing an ion mill at an angle from normal to the top surface, the angle being at least seventy degrees and not more than eighty degrees, the ion mill removing the portion of the insulating layer on the at least one side of the single layer mask and a portion of the capping layer on the at least one side of the insulating layer;
    performing a lift off, the lift off removing the single layer mask;
    removing a remaining portion of the covered portion of the BARC layer, a top of the magnetoresistive structure being exposed; and
    performing a touch planarization.

15. The method of claim 14 wherein the step of removing the portion of the BARC layer further includes:
    performing a reactive ion etch.

16. The method of claim 14 wherein the touch planarization is a touch chemical mechanical planarization (CMP) and wherein the touch CMP is performed using a pressure of not more than two psi.

* * * * *